United States Patent Office 3,281,233
Patented Oct. 25, 1966

3,281,233
GROWTH STIMULATION OF PLANTS BY HYDRO-
CARBONYLENE BIS SULFONAMIDES
Theodore W. Holmsen, Midland, Mich., assignor to The
Dow Chemical Company, Midland, Mich., a corporation of Delaware
No Drawing. Filed Sept. 10, 1963, Ser. No. 307,778
3 Claims. (Cl. 71—2.6)

This invention is concerned with growth alternation and modification, and is particularly directed to methods and compositions for modifying and altering the growth of plants and plant parts.

The method of the present invention comprises exposing a viable plant part to sulfonamide compound of the formula

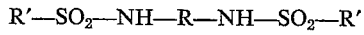

$$R'-SO_2-NH-R-NH-SO_2-R'$$

wherein R represents a divalent hydrocarbonylene radical selected from the group consisting of alkylene being of from 2 to 10, inclusive, carbon atoms, 2-butylene, cyclohexylene, and cyclohexylenedimethylene; and R' represents a member of a group consisting of loweralkyl being of from 1 to 4, inclusive, carbon atoms, phenyl, and substituted phenyl. These compounds are crystalline solid materials. They are somewhat soluble in many organic solvents and of low solubility in water.

In the present specification and claims, the term "alkylene" is employed to refer to straight-chain divalent hydrocarbonylene radicals as well as to branched-chain divalent hydrocarbonylene radicals; and the term "substituted phenyl" refers to a phenyl radical which is ring substituted with one or more substituent moieties selected from the group consisting of halo, loweralkyl, loweralkoxy, nitro, and carboloweralkoxy. Representative alkylene radicals include ethylene, propylene, tetramethylene, 2-ethyltrimethylene, hexamethylene, nonamethylene, 1,8-dimethyloctamethylene, and heptamethylene; and representative substituted phenyl radicals include tolyl, xylyl, bromophenyl, dichlorophenyl, tribromophenyl, trimethylphenyl, chloroxylyl, nitrotolyl, dinitrophenyl, 2-chloro-4-tertiary-butylphenyl, tetramethylphenyl, 3,5-bis(carbomethoxy)phenyl, and p-ethoxyphenyl.

Where every substituent moiety is halo and/or loweralkyl, the substituted phenyl radical can be substituted by, subject only to known factors of steric hindrance, up to and including five substituent moieties. Where not every substituent moiety is halo and/or loweralkyl, the substituted phenyl radical can be substituted by one or two substituent moieties.

Illustrative of the compounds to be employed according to the present invention are ethylene bis(benzenesulfonamide); ethylene bis(m-nitrobenzenesulfonamide); pentamethylene bis(benzenesulfonamide); hexamethylene bis(methanesulfonamide); tetramethylene bis(methanesulfonamide); ethylene bis(methanesulfonamide); trimethylene bis(methanesulfonamide); ethylene bis(p-toluenesulfonamide); hexamethylene bis(benzenesulfonamide); pentamethylene bis(methanesulfonamide); hexamethylene bis(ethanesulfonamide); octamethylene bis(methanesulfonamide); ethylene bis(1-butanesulfonamide), ethylene bis(ethanesulfonamide); ethylene bis(3,4-dichlorobenzenesulfonamide); hexamethylene bis(m-nitrobenzenesulfonamide); hexamethylene bis(1-butanesulfonamide); hexamethylene bis(p-toluenesulfonamide); hexamethylene bis(3,4-dichlorobenzenesulfonamide); propylene bis(methanesulfonamide); 1,4-cyclohexylenedimethylene bis(benzenesulfonamide); nonamethylene bis(methanesulfonamide); heptamethylene bis(1-methylethanesulfonamide); decamethylene bis(2-methyl-1-propanesulfonamide); 1,2-cyclohexylene bis(5-bromo-o-toluenesulfonamide); 2-butenylene bis(methanesulfonamide); 2,5-diethyl-1,6-hexamethylene bis(1-propanesulfonamide); 2,2,4-trimethyl-1,5-pentamethylene bis(ethanesulfonamide); ethylene bis(1-methylethanesulfonamide); 1,4-cyclohexylene bis(pentachlorobenzenesulfonamide); 2-butenylene bis(3,5-bis(carboethoxy)benzenesulfonamide); decamethylene bis(3-carbomethoxy-5-nitrobenzenesulfonamide); pentamethylene bis(2,3,4,5-tetramethylbenzenesulfonamide); ethylene bis(p-methoxybenzenesulfonamide); and methylene bis(3-ethyl-5-isopropylbenzenesulfonamide).

More particularly, it has been discovered that the exposure of a viable form of plants to the action of sulfonamide compound gives rise to different responses depending upon the nature of the plant, the stage of growth or maturity of the plant, and the dosage of sulfonamide compound at which the exposure is carried out. Thus, the application to plants, plant parts, and their habitats of a herbicidal amount of sulfonamide compound suppresses and inhibits the growth of seeds, emerging seedlings, and established vegetation. The application to plants of a lesser and growth-stimulant amount of sulfonamide compound imparts beneficial effects to the growth of the plants, such as, for example, increased size of produce, or of yield of crop; earlier plant maturation; improved qualitative content of plant parts, such as protein content in legumes; and in members of the Gramineae family; delayed senescence, and the like. The application of sulfonamide compound to plants may be made by contacting the compound with seeds, seedlings, established vegetation, roots, stems, flowers, fruits, and the like, or by applying the compound to soil.

The application to a viable plant part of a growth altering amount of sulfonamide compound is essential and critical for the practice of the present invention. The exact dosage to be supplied is dependent upon the plant, plant part, or habitat which is treated, the stage of growth of the plant or plant part treated, and, in many instances, the particular part of the plant to which the sulfonamide compound is applied. In foliar applications of herbicidal dosages, liquid compositions containing from about 4,000 or less to 20,000 or more parts of sulfonamide compound per million parts by weight of ultimate composition can be conveniently applied to plant surfaces. In the application to growth media of herbicidal dosages of sulfonamide compound, good results are obtained when the compound is supplied to the growth media in an amount of from about 5 to 300 parts or more by weight per million parts by weight of the media. Where the growth media is soil, good results are obtained when the sulfonamide compound is distributed therein at a rate of from about 20 or less to 300 pounds or more per acre and through such a cross section of the soil as to provide for the presence therein of sulfonamide compound in an amount of from 20 to 300 parts per million. In such application, it is desirable that the compound be distributed to a depth of at least 0.5 inch and at a substantially uniform dosage of at least 10 pounds per acre inch of soil. The weathering action of the sun, rain, and possibly the decomposition of the agents by the action of soil organisms, eventually reduces their concentration in soil, or other growth media.

In other operations, the present sulfonamide compounds are employed in plant growth stimulating dosages. In such operations, good results are obtained when the compounds are applied to plants in dosages of from 0.001 or less to 20 or more pounds per acre. In other similar operations, liquid compositions containing from about 1 to 4,000 or more parts per million can be conveniently applied to the plant surfaces. In the treatment of seed to stimulate seedling growth and obtain improved yield of the plants produced by such seeds, good results are obtained when the seeds are treated with from about 1 to 250 grams (about 0.035 to 9 ounces) of compounds per hundred pounds of seed.

The method of the present invention can be carried out by exposing plants, plant parts, or their habitats to the action of the unmodified compounds. The present method also comprehends the employment of a liquid or dust composition containing one or more of the present compounds as an active component. In such usage, the active component is modified with one or a plurality of additaments or adjuvants for plant growth modification compositions such as water or other liquid carriers, surface-active dispersing agents, and finely divided solids. Depending upon the concentration of active compound, such augmented compositions are adapted to be applied to the plants, plant parts, and their habitats, or to be employed as concentrates and subsequently diluted with additional inert carrier to produce the ultimate treating compositions. In compositions where the adjuvant or helper is a finely divided solid, a surface-active agent or a liquid additament, the carrier cooperates with the active component so as to facilitate the invention, and to obtain an improved and outstanding result.

In addition, the present method also comprehends the employment of aerosol compositions containing one or more of the present compounds as an active agent. Such compositions are prepared according to conventional methods wherein the agent is dispersed in a solvent and the resultant dispersion mixed with a propellant in liquid state. Such variables as the particular compound to be used and the particular substrate to be treated will determine the identity of the solvent and the concentration of the active compound. The solvent should be of low phytotoxicity, such as water, acetone, isopropanol or 2-ethoxyethanol, in compositions to be applied to plants for plant stimulation and crop yield improvement.

The exact concentration of the active compound to be employed in the treating compositions is not critical and can vary considerably provided the required dosage of effective agent is supplied upon the plant, plant part, or its habitat. The concentration of the active agent in liquid compositions employed to supply the desired dosage generally is from about 0.0001 to 50 percent by weight. Concentrations of up to 95 percent by weight are oftentimes conveniently employed. In dusts the concentration of active component can be from about 0.01 to 20 percent by weight. In compositions to be employed as concentrates, the active component can be present in a concentration of from about 5 to 98 percent by weight.

The quantity of the composition applied is not critical provided only that the required dosage of active component is applied in sufficient of the finished composition to cover adequately the plant, plant part, or habitat to be treated.

Liquid compositions containing the desired amount of active component can be obtained by dissolving the compound in an organic liquid carrier or by dispersing the active agent in water. With the water-insoluble agents, the dispersion is facilitated and conveniently accomplished with the aid of a suitable surface-active dispersing agent such as an ionic or non-ionic emulsifying agent. The aqueous compositions can contain one or more water-immiscible solvents for the active agent. In such compositions, the carrier can comprise an aqueous emulsion, that is, a mixture of water-immiscible solvents, emulsifying agent and water. The choice of dispersing and emulsifying agent and the amount thereof employed is dictated by the nature of the composition type and by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyethylene derivatives of sorbitan esters, complex alcohols, mahogany soaps and the like.

In the preparation of dust compositions, the active component is dispersed in and on a finely divided solid which is non-reactive with the active agents such as talc, chalk, gypsum, and the like. In such operations, the finely divided carrier is mixed with the active compound or a volatile organic solvent solution thereof. Similarly, dust compositions containing the active compounds are prepared from various of the solid surface-active dispersing agents, such as bentonite, fuller's earth, attapulgite and other clays. Depending upon the proportion of ingredients, the dust compositions can be employed as concentrates and subsequently diluted with additional solid surface-active dispersing agent or with talc, chalk or gypsum and the like to obtain the desired amount of active component in compositions adapted to be applied to plants, plant parts, or their habitats. Also, such concentrated dust compositions can be dispersed in water with or without the aid of a dispersing agent, to form spray mixtures. Preferred finely divided solid adjuvants include those which are of low phytotoxicity to plants and plant parts.

When operating in accordance with the present invention, the active agents or compositions containing the agents are applied to the plants, plant parts, or their habitats in growth-modifying amounts in any convenient fashion, for example, with power dusters, boom and hand sprayers, and spray dusters. In another procedure, the agents or compositions containing the same are drilled into soil and further distributed therein in conventional procedures.

The following examples illustrate the best manner of employing the present invention, and, without more, will enable those skilled in the art to practice the present invention.

*Example 1*

Compositions containing the compounds of the present invention are prepared in various procedures. In one procedure, four parts by weight of one of the sulfonamide compounds, 0.08 part of sorbitan trioleate (Span 85) and 0.02 part of a sorbitan monolaurate polyoxyethylene derivative (Tween 80) are dispersed in forty milliliters of acetone to produce a concentrate composition in the form of a water-dispersible liquid.

In another procedure, one of the sulfonamide compounds is formulated in water with an alkyl aryl sulfonate (Nacconol NR) and a substituted benzoid alkyl sulfonic acid (Daxad No. 27) to produce aqueous compositions. In such operations, the materials are ballmilled together to produce compositions containing varying amounts of one of the active agents, 300 parts by weight of Nacconol NR and 300 parts by weight of Daxad No. 27 per million parts by weight of ultimate aqueous mixture. In this manner, ballmilled compositions are prepared from all of the sulfonamide compounds illustrated in paragraph four.

*Example 2*

Liquid compositions are prepared with ethylene bis(benzenesulfonamide), pentamethylene bis(benzenesulfonamide), hexamethylene bis(methanesulfonamide), tetramethylene bis(methanesulfonamide), and hexamethylene bis(3,4-dichlorobenzenesulfonamide) in the ballmilling procedure described in Example 1 and each containing an amount of one of the named active agents.

These compositions are employed for the treatment of seed beds of sandy loam soil of good nutrient content. Prior to the treatment, the soil is seeded with the seeds of peas (*Pisum sativum*) and beans (*Phaseolus vulgaris*). In the treating operations, the composition is applied as a soil drench and at a rate of about 0.434 acre inch of aqueous composition per acre to supply varying amounts of one of the compounds per acre and varying concentrations of one of the compounds in the soil. Other areas similarly seeded with the named plant species are left untreated to serve as checks. Following the treating operations, the seed beds are observed at regular intervals to ascertain any appreciable affects upon the germination of the seeds and the growth of the seedlings.

Two weeks following the treating operations, the average height of the plants above the ground line in the treated seed beds is measured and compared with the average height of the plants in the untreated seed beds. At the time the measurements are taken, all of the treated and untreated seed beds support abundant stands of healthy plants of the named species. The results of the measurements, the agents employed, and the concentrations and dosages at which the agents are employed are set forth in the following table.

*Example 4*

Aqueous compositions each containing 1,000 parts by weight of one of various sulfonamide compounds per million parts by weight of ultimate mixture are prepared according to the ballmilling procedures in Example 1. These compositions are employed in post-emergent applications for the treatment of pea plants. In the treating operations, the compositions are applied as foliage sprays to plots of the pea plants. At the time of the applications, the plants are from 2 to 4 inches in height. The treatments are carried out with conventional spraying equipment, the applications being made to the point of run-off. Similar plots of pea plants are left untreated to serve as checks.

Two weeks following the treating operations, the average height above the ground line of the treated pea plants is measured and compared with the average height above the ground line of the untreated pea plants. At the time the measurements are taken, all of the treated and untreated plots support stands of pea plants in healthy condition. The test compounds employed and the results of the measurements are set forth in the following table.

| Test Compound | Concentration of Test Compound in Composition | Dosage of Test Compound | | Percent Greater Stem Elongation of Plants from Treated Soil than from Untreated Soil | |
|---|---|---|---|---|---|
| | | Pounds per acre | Parts per million by weight of soil | Peas | Beans |
| Ethylene bis(benzenesulfonamide) | 0.0086 | 1 | 1.6 | 27 | 70 |
| | 0.0432 | 5 | 8 | 20 | 21 |
| Pentamethylene bis(benezenesulfonamide) | 0.0086 | 1 | 1.6 | 10 | 20 |
| | 0.0432 | 5 | 8 | 38 | 25 |
| Hexamethylene bis(methanesulfonamide) | 0.0086 | 1 | 1.6 | 20 | 50 |
| Tetramethylene bis(methanesulfonamide) | 0.0086 | 1 | 1.6 | 46 | 50 |
| Hexamethylene bis(3,4-dichlorobenzenesulfonamide) | 0.0086 | 1 | 1.6 | 114 | 30 |

*Example 3*

An aqueous spray composition containing 4,000 parts of hexamethylene bis(ethanesulfonamide) per million parts by weight of ultimate mixture is prepared in the manner, described as the ballmilling procedure, of Example 1. This aqueous composition is employed for the treatment of soil and observations made for the control of the growth of seeds and emerging seedlings of Japanese millet (*Echinochloa frumentacea*). In these determinations, the composition is employed to treat seed beds which have been prepared and seeded with Japanese millet. In the treating operation, the composition is applied as a soil drench and at a rate of about 0.434 acre inch of aqueous composition per acre to supply a uniform dosage of about 50 pounds of the active agent per acre. This dosage corresponds to a concentration of about 80 parts by weight of the activated agent per million parts by weight of soil. Other adjacent seed beds similarly seeded with Japanese millet are left untreated to serve as checks.

After about two weeks, the plots are examined to ascertain what percent kill and control of the growth of seeds and emerging seedlings of Japanese millet is obtained. The observations show that in each of the plots treated with hexamethylene bis(ethanesulfonamide), there is obtained a 100 percent kill and control of the growth of seeds and emerging seedlings of Japanese millet. At the time of the observations, the untreated check beds are found to support abundant stands of vigorously growing plants of Japanese millet.

| Test Compounds | Percent Greater Stem Elongation of Treated Pea Plants than of Untreated Pea Plants |
|---|---|
| Ethylene bis(p-toluenesulfonamide) | 40 |
| Hexamethylene bis(benzenesulfonamide) | 33 |
| Octamethylene bis(methanesulfonamide) | 36 |
| Ethylene bis(1-butanesulfonamide) | 30 |
| Hexamethylene bis(p-toluenesulfonamide) | 20 |

The sulfonamide compounds of the present invention are prepared in known procedures in which a hydrocarbonylenediamine compound of the formula

$$NH_2—R—NH_2$$

is reacted with a sulfonyl chloride compound of the formula

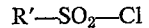

$$R'—SO_2—Cl$$

in the presence of the hydrogen halide acceptor.

The reaction is conveniently carried out in the presence of an inert liquid reaction medium, for example, water, benzene, ether, methylene chloride, chloroform, hexane, and carbon tetrachloride. The amounts of the reactants to be employed are not critical, the desired product compound being obtained when employing the reactants in any amounts. The reaction consumes the reactants in amounts which represent one molecular proportion of hydrocarbonylenediamine compound, two molecular proportions of sulfonyl chloride compound, and two molecular proportions of hydrogen halide acceptor. Higher yields result from the use of one molecular proportion of hydrocarbonylenediamine compound, four or more molecular proportions of sulfonyl chloride compound, and two or more molecular proportions of hydrogen halide acceptor, and the use of such proportions is preferred.

The hydrogen halide acceptor can be any of those conventionally employed in organic synthesis; for example, an alkali metal hydroxide, a tertiary amine, pyridine, and the like. It is sometimes convenient to employ the hydrogen halide acceptor in large excess so that it serves both as hydrogen halide acceptor and as solvent for the reactants.

The reaction takes place smoothly at temperatures between 0° and 100°, and preferably, at temperatures of between 10° and 45°, with the production of the desired product compound in the reaction. In carrying out the reaction, the reactants and the hydrogen halide acceptor are contacted together in any convenient fashion and maintained for a period of time within the reaction temperature range to complete the reaction. The yield of desired product compound is increased by permitting the reaction mixture to stand for a period of time after contacting of the reactants. Following the completion of the reaction, the desired reactant material can be separated and purified, according to procedures known by those skilled in the art.

In the present specification and claims, the term "viable plant part" is inclusive of stems, branches, roots, rootlike structures, foliage, flowers, fruit, seeds, storage structures, bulbs, and corms of plants.

I claim:
1. Method which comprises applying to a viable plant part a growth stimulant amount of sulfonamide compound of the formula

R'—SO$_2$—NH—R—NH—SO$_2$—R' wherein R represents a divalent hydrocarbonylene radical selected from the group consisting of alkylene being of from 2 to 10, inclusive, carbon atoms, 2-butenylene, cyclohexylene, and cyclohexylenedimethylene and R' represents a member of the group consisting of lower alkyl being of from 1 to 4, inclusive, carbon atoms, phenyl, and substituted phenyl.

2. Composition comprising from 5 to 98 percent by weight of an active ingredient in admixture with a finely divided solid and a surface active agent, the active ingredient being sulfonamide compound of the formula

R'—SO$_2$—NH—R—NH—SO$_2$—R' wherein R represents a divalent hydrocarbonylene radical selected from the group consisting of alkylene being of from 2 to 10, inclusive, carbon atoms, 2-butenylene, cyclohexylene, and cyclohexylenedimethylene; and R' represents a member of the group consisting of lower alkyl being of from 1 to 4, inclusive, carbon atoms, phenyl, and substituted phenyl.

3. The composition which comprises an aqueous dispersion of the composition claimed in claim 2, the active ingredient in such composition being present in the amount of at least 0.0001 percent by weight.

References Cited by the Examiner
FOREIGN PATENTS 823,970   12/1951   Germany.

OTHER REFERENCES

Chemical Abstracts, volume 39, page 40735 (1945), volume 40, page 3413$^2$ (1946).

Chemical Abstract (Fromm et al.), volume 50, page 13179g (1956).

ELBERT L. ROBERTS, *Acting Primary Examiner.*

JAMES O. THOMAS, Jr., *Examiner.*

A. J. ADAMCIK, *Assistant Examiner.*